March 15, 1932.  A. M. THOMSON  1,849,123

SUCKER ROD

Filed June 18, 1930

INVENTOR
Alfred Morris Thomson
BY
ATTORNEYS

Patented Mar. 15, 1932

1,849,123

UNITED STATES PATENT OFFICE

ALFRED MORRIS THOMSON, OF NEWARK, NEW JERSEY, ASSIGNOR TO DARDELET THREADLOCK CORPORATION, OF NEW YORK, N. Y., A CORPORATION OF DELAWARE

SUCKER ROD

Application filed June 18, 1930. Serial No. 462,002.

This invention relates to improvements in sucker rods for oil wells and the like.

The principal objects of the invention are to provide a sucker rod comprising thread coupled sections wherein the construction is such as to eliminate or largely reduce the cocking movements between the threaded portions of the sections which break the pin and break down or strip the engaged coupling threads, and to provide an efficient tight-holding coupling for sucker rod sections coupled by ordinary non-locking threads such as the standard V thread wherein liability of pin fracture or breaking down of the threads is avoided or greatly reduced.

Figure 1:
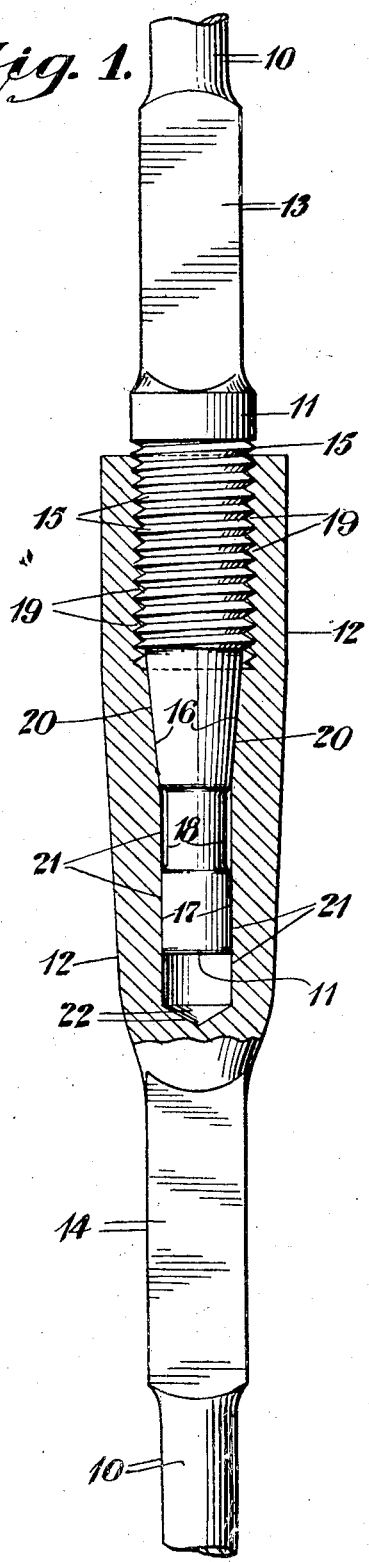
Figure 2:
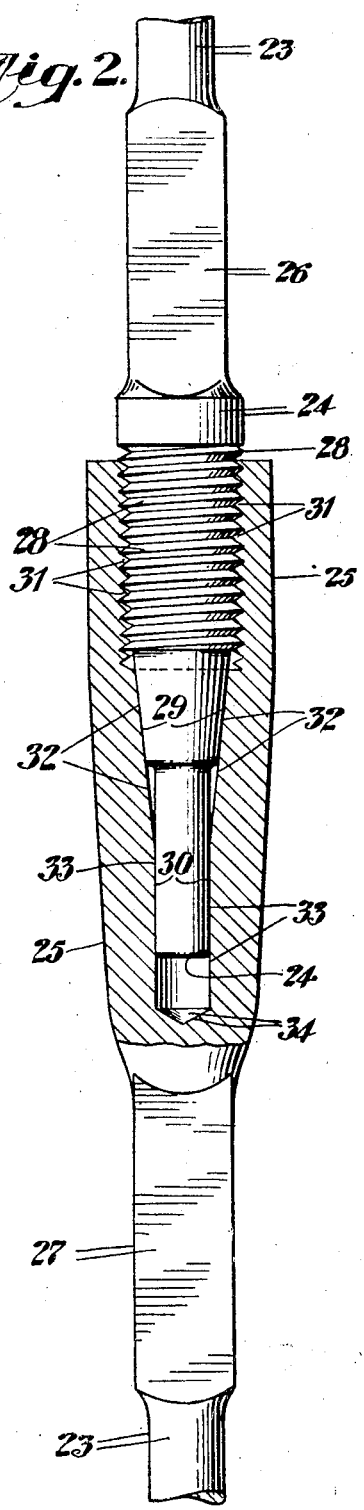

In the accompanying drawings,

Fig. 1 is a view, partly in longitudinal section, showing one form of sucker rod embodying the invention; and Fig. 2 is a similar view of a slightly modified form of sucker rod also embodying the invention, the rods being shown in the position in which they extend into the well.

Referring first to the construction illustrated in Fig 1, the rod comprises identical rod sections each having a cylindrical main body portion 10, a pin 11 at its lower end, a pin box 12 at its upper end, and squared wrench-receiving portions 13 and 14 located respectively at the upper end of the pin and lower end of the box.

The upper portion of the pin is non-tapering and carries an external screw thread 15. Directly below thread 15 the pin has a non-threaded conoidal friction clutch portion 16 tapering downward and inward. The major diameter of said clutch portion does not exceed, and may be the same as, the root diameter of the pin thread, as shown. The pin has a cylindrical terminal bearing portion 17 of the same diameter as the smaller end of conoidal portion 16 and separated therefrom a substantial distance by a reduced cylindrical connecting pin portion 18.

The box bore has a non-tapered upper or mouth portion carrying an internal screw thread 19 engaged with and complementary to the pin thread 15, said threads in the construction shown being ordinary non-locking V threads. Directly below thread 19 the box bore has a non-threaded conoidal friction clutch portion 20 complementary to pin clutch portion 16 and in which said pin portion is tightly jammed in the fully coupled position of the rod sections shown. The box bore has a cylindrical lower bearing portion 21 directly below portion 20 and of the same diameter as pin portion 17 and the lower end of portion 20. The bore terminates in an end wall 22 and is preferably of such length that the pin does not bottom on the end or bottom wall of the box when the clutch portions of the pin and box are tightly jammed one within the other, as shown. Pin portion 17 is telescoped in bore portion 21 at a point spaced from and relatively remote from the clutch portion and the threads.

The pin preferably extends above the mouth of the box in the coupled position, and the usual pin collar is preferably omitted, the box mouth having no end or axial abutment with the uppermost rod section, as shown.

Referring to the modified form of rod illustrated in Fig. 2, said rod comprises identical rod sections each having a cylindrical main body portion 23, a pin 24 at its lower end, a pin box 25 at its upper end, and two squared wrench-receiving portions 26 and 27 located respectively at the upper end of the pin and lower end of the box.

The upper portion of the pin is non-tapering and carries an external screw thread 28. Directly below thread 28 the pin has a non-threaded conoidal friction clutch portion 29 tapering downward and inward, said portion having a major diameter not exceeding the root diameter of thread 28. The remaining or lower terminal portion of the pin is a cylindrical bearing portion 30 of substantial length and of substantially less diameter than the minor diameter of clutch portion 29.

The box bore has a non-tapered upper or mouth portion carrying an internal screw thread 31 engaged with and complementary to the pin thread, said threads in the construction shown being standard V threads. Directly below thread 31 the box bore has a non-threaded conoidal friction clutch portion 32 having the same downward and inward taper as clutch portion 29 of the pin and in which said pin portion is tightly jammed in the fully coupled position of the sections shown. Clutch portion 32 is substantially longer than clutch portion 29 so as to extend a substantial distance downward below the lower end of clutch portion 29 when the two clutch portions are tightly jammed one within the other, as shown. The box bore has a cylindrical lower bearing portion 33 directly connected with clutch portion 32 and of the same diameter as the lower bearing portion 30 of the pin and the minor diameter of portion 32, the lower part of pin portion 30 being telescoped in bearing portion 33 at a point spaced from and relatively remote from the clutch portions and threads. The box bore terminates in a bottom wall 34, and portion 30 is preferably of such length that the pin does not bottom on said wall. The box mouth preferably has no end abutment with any portion of the uppermost rod section.

It will be observed that in both constructions the pin has two longitudinally spaced peripheral bearings in the box at one end of the coupled threads, one of said bearings being a conical bearing and the other a cylindrical bearing, and one being immediately adjacent the coupled threads and the other relatively remote from the threads and the first bearing. It will also be observed that the constructions are such as to prevent or reduce liability of accidental unscrewing of the rod sections and of cocking between the threaded parts, by reason of the construction and arrangement of the spaced bearings.

What I claim is:

1. A jointed rod comprising two rod members separably interfitted end to end, wherein said members are free from abutting shoulders and are mutually engaged and held together against relative axial and angular movements solely through the engagements between a pair of coupled screw threads on non-tapered portions of said members, a pair of telescoped cylindrical friction surfaces on said members, and a pair of telescoped conoidal friction clutch surfaces on said members, which conoidal surfaces taper toward the rod axis in the direction of the entering end of the member having the external thread of said pair of threads and are wedged together at a point between the inner end of the screw thread connection and the nearest point of engagement of said pair of cylindrical surfaces, whereby the members are held against accidental unscrewing and localization of bending stresses in the rod joint is prevented.

2. A jointed rod as claimed in claim 1, wherein the externally threaded member has a portion with a radial clearance entirely therearound in the internally threaded member for a substantial distance longitudinally of the rod joint, and is engaged with the internally threaded member through the medium of said telescoped cylindrical surfaces and telescoped conoidal surfaces at opposite ends of said portion having said radial clearance, whereby rod bending stresses are widely distributed along the rod and in the joint.

In testimony whereof I hereunto affix my signature.

ALFRED MORRIS THOMSON.